Jan. 24, 1933.   N. M. MARSILIUS   1,895,333
MILLING MACHINE
Filed Jan. 30, 1929   4 Sheets-Sheet 1
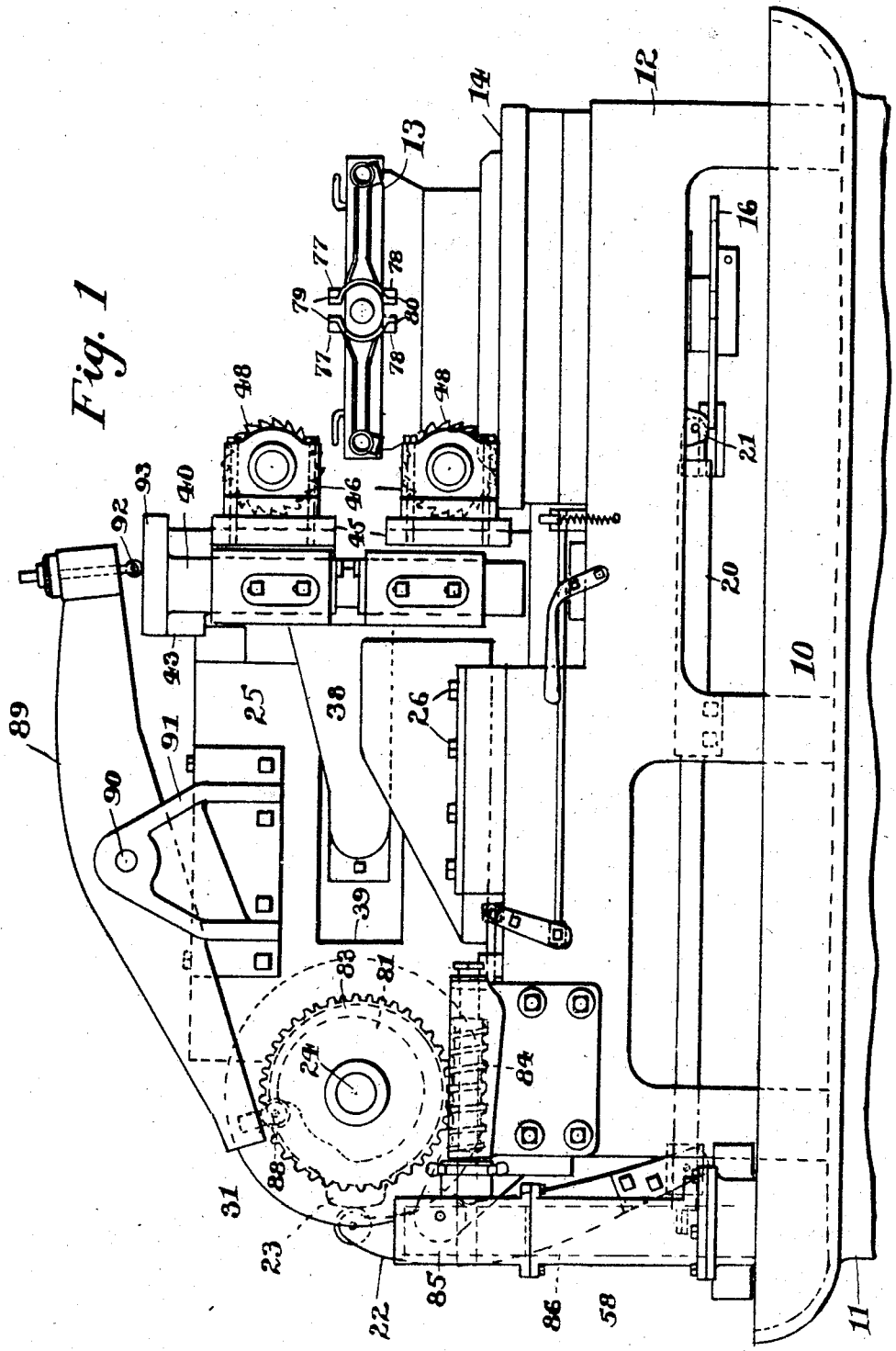
INVENTOR.
Newman M. Marsilius
BY
Chamberlain & Newman
ATTORNEYS.

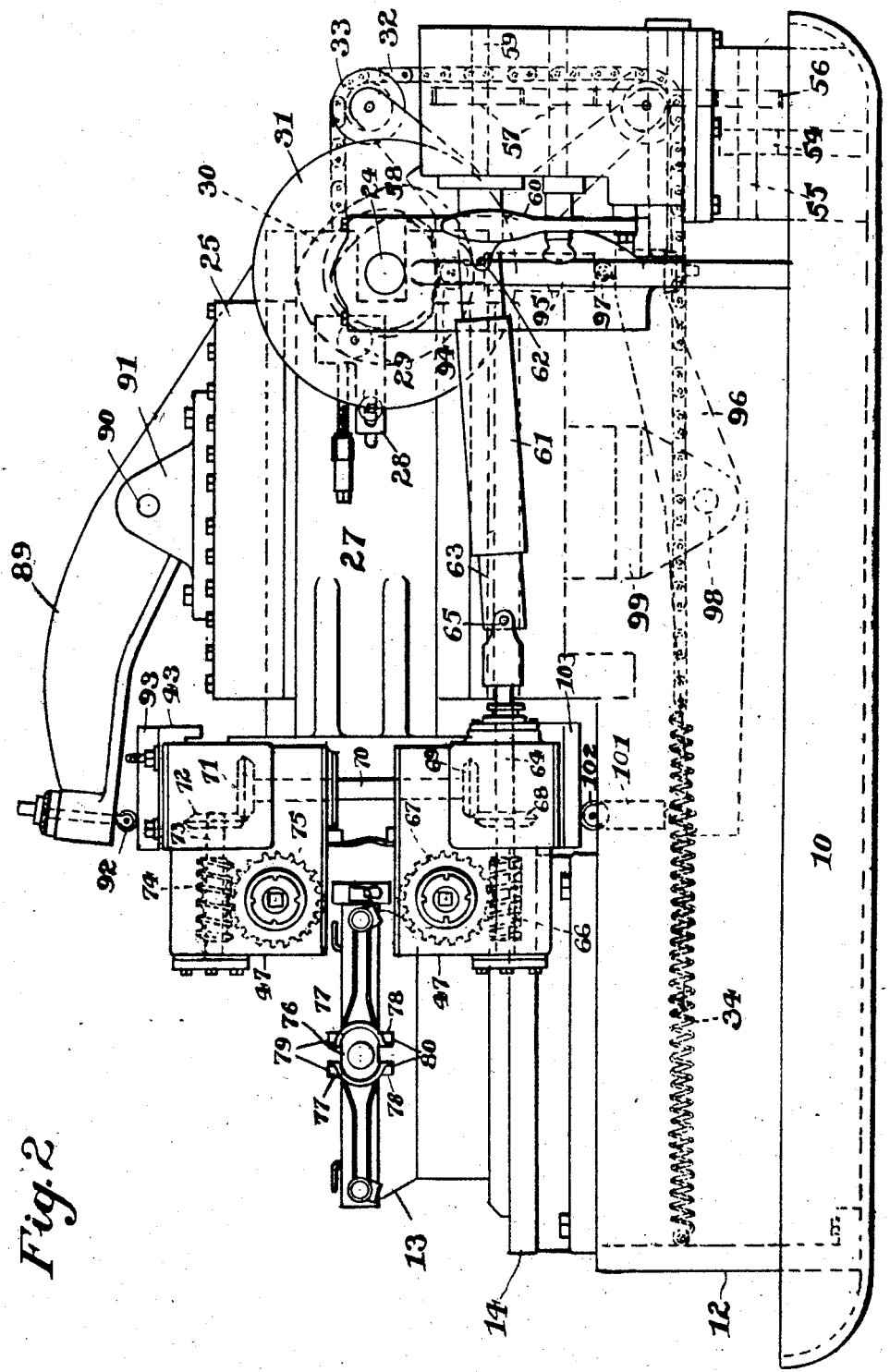

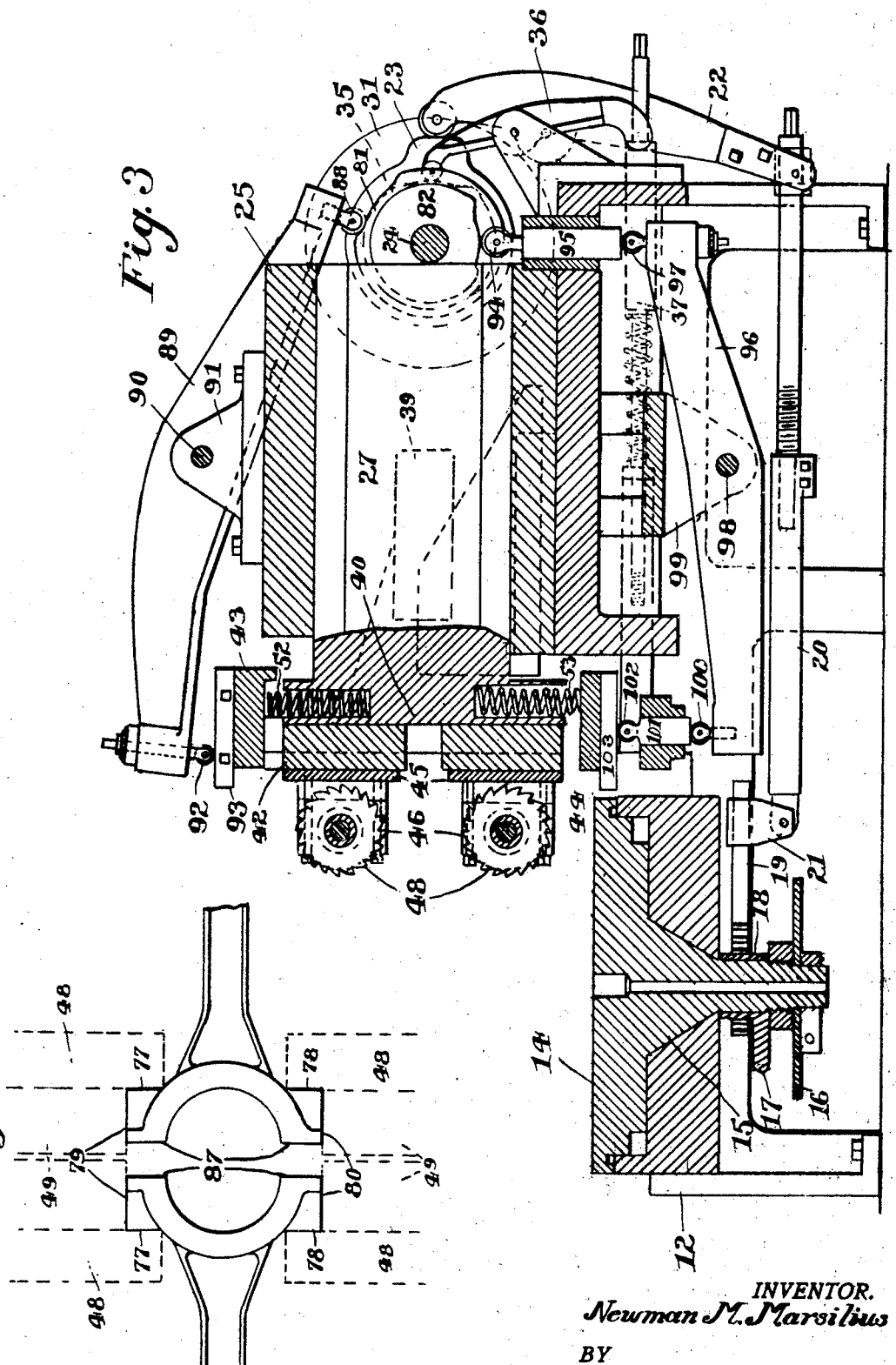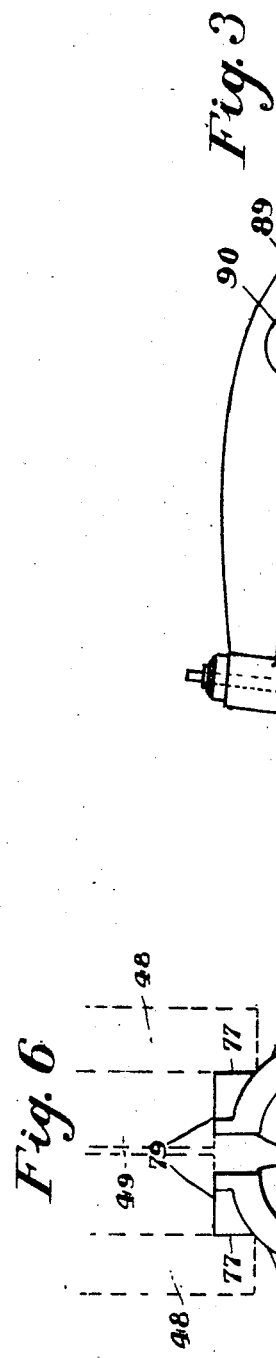

Jan. 24, 1933.   N. M. MARSILIUS   1,895,333
MILLING MACHINE
Filed Jan. 30, 1929   4 Sheets-Sheet 4

INVENTOR.
Newman M. Marsilius
BY
Chamberlain & Newman
ATTORNEYS.

Patented Jan. 24, 1933

1,895,333

UNITED STATES PATENT OFFICE

NEWMAN M. MARSILIUS, OF BRIDGEPORT, CONNECTICUT, ASSIGNOR TO THE PRODUCTO MACHINE COMPANY, OF BRIDGEPORT, CONNECTICUT, A CORPORATION OF CONNECTICUT

MILLING MACHINE

Application filed January 30, 1929. Serial No. 336,067.

My present invention relates to new and useful improvement in milling machines of the turret station type and seeks generally to improve upon a machine of well known make as well as other machines of the same type.

A further object of the invention is to provide a turret type of milling machine including relatively movable cutters and means for moving the cutters toward and away from each other, whereby according to the present disclosure the respective cutters work simultaneously but on opposite sides of a piece of work.

Additional objects are to provide a simple structure for moving the cutters toward and away from each other, and a machine adapted for high speed production.

The machine is shown as adapted for performing an operation on connecting rods but it is to be understood that the machine is capable of other work and that changes in the construction, combination and arrangement of parts as well as in proportion and size may be made without departure from the spirit of the invention or the scope of the appended claims to which reference must be had for a definition of the limitations of the invention.

In the accompanying drawings:

Fig. 1 is a side of the improved machine;

Fig. 2 is a similar view from the opposite side;

Fig. 3 is a longitudinal sectional view showing the mounting for the cutter slide and carriage;

Fig. 6 is a detail showing the operative relation of the cutters to the work.

Figure 4:
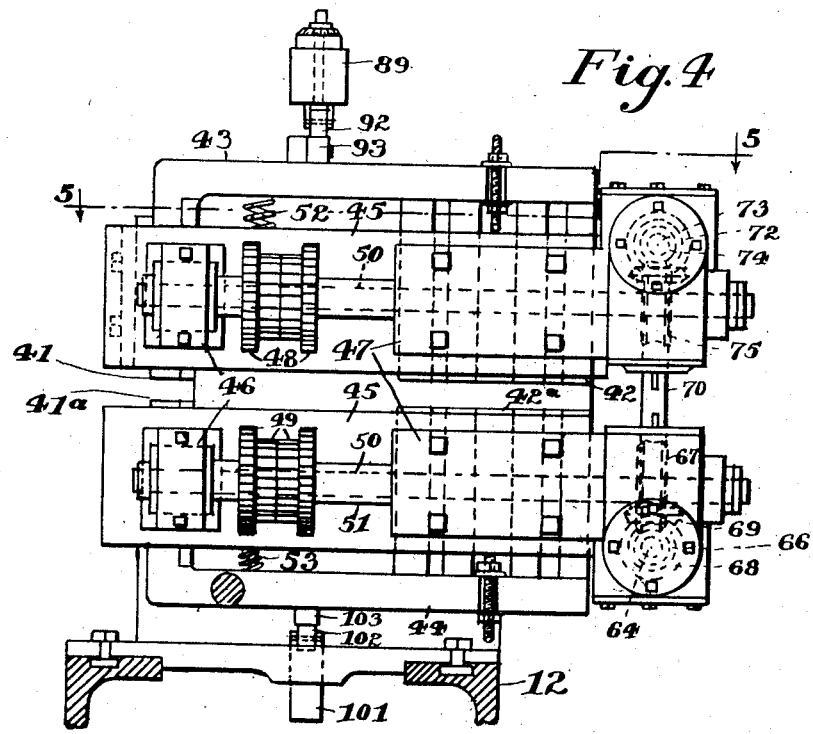
Fig. 4 is a front elevation of the cutter mechanism.
Figure 5:
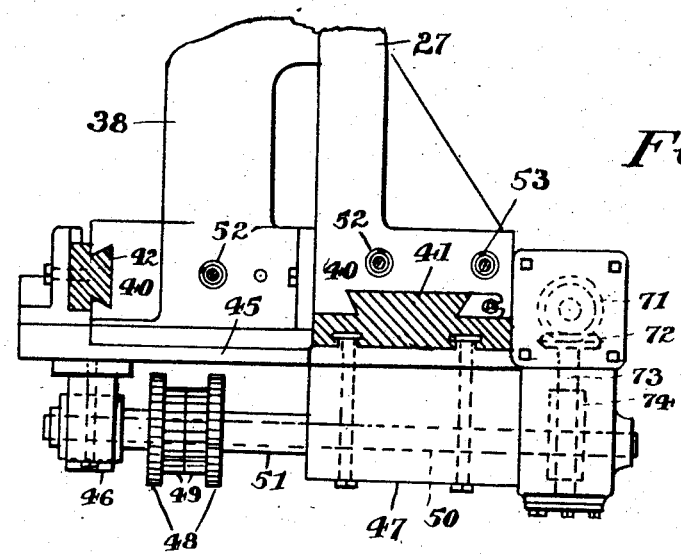
Fig. 5 is a sectional view taken on the line 5—5 of Fig. 4.

Referring in detail to the drawings, a receptacle 10, adapted to catch oil and chips and provide a place for tools or other parts is shown. This receptacle rests upon or is formed with a cabinet 11 as completely shown in my Patent Number 1,756,831, of which this invention is an improvement.

Within the receptacle 10 is the bed 12 of the machine and on this bed are mounted the operating parts. At the forward part of the machine is mounted a turret 13, operating on a vertical axis and being four sided or faced and having means for properly positioning two connecting rods on each of its faces. Obviously other means may be employed for holding different pieces of work.

The turret 13 is mounted upon a pedestal secured to a rotatable table 14 (see Fig. 3), having a central depending spindle 15 journalled in the frame as shown. As is fully disclosed in my Patent Number 1,756,831 before referred to, the lower end of spindle 15 carries a ratchet disk 16 in the present instance provided with four notches, one for each side or face of the turret.

These notches are to be engaged by a pawl (not shown) carried in the outer end of a rocker arm 17 journalled upon a cylindrical portion 18 of the spindle 15. The inner or hub portion of arm 17 is provided with teeth to be engaged by the teeth of a rack bar 19. Since this indexing mechanism is taken from and is fully disclosed in my pending application referred to I will not here go into detail. However it might be stated that the rack bar 19 is reciprocated longitudinally by means of a bar or rod 20, connected to rack 19 by a link 21, the rod 20 being given movement by a rocker arm 22 which in turn is moved by a cam 23 on a cam shaft 24.

Mounted rearwardly on the table 12 is a stationary guide or support 25 bolted or otherwise secured to the bed 12 as at 26. A horizontally reciprocatory cutter carriage 27 is mounted in the guide 25. For the purpose of imparting movement to the carriage 27 a bracket 28 is adjustably secured to the side of the carriage and provided with a roll 29 operating in a cam groove 30 in a cam 31 on the shaft 24. A chain 32 which passes over rollers 33 is secured at one end to the carriage and at its other end to a spring 34. The spring 34 normally acts to maintain the carriage in its rear position as shown in the drawings.

The cam 35 through rocker arm 36 and rod 37 serves to lock the turret in its several positions as fully disclosed in my prior patent heretofore referred to.

Carriage 27 includes a branch or extension 38 extending through a slot or opening 39 in the guide 25. An enlargement or head 40 is formed on the forward end of the carriage 27 and the branch or extension before mentioned and in said head is provided vertical ways to receive corresponding dove-tails on vertical members 41 and 42 carried on upper cross member 43, and like dove-tails on similar vertical members 41ª and 42ª of lower cross member 44, which together with said vertical members make up the cutter slides of which there is an upper and a lower, each carrying cutters.

A supporting member 45 is secured to the face of each slide and is provided with bearings 46 and 47 mounted between which are cutters 48 and 49 on a cutter carrying and driving arbor 50. Suitable sleeves 51 may be disposed about the arbors at the outer side of each of the cutters 48 to maintain the cutters properly positioned on the arbors.

Coil springs 52 carried by the carriage engage the under side of the upper slide member 43 to maintain the upper cutters elevated and to return them to normal position. Similar springs 53 engage the upper side of the lower frame or slide member 44 to maintain the lower cutters depressed and to return them to normal position. From the foregoing description it will now be clear that the upper and lower cutters may be moved toward each other against the action of the springs 52 and 53.

Means much like that shown in my application Serial Number 251,843, filed February 4, 1928, is provided for rotating the cutters. To this end power from any suitable source drives gear 54 which through shaft 55 drives gear 56 operating through a gear train 57 in a housing 58 to drive shaft 59. Housing 58 preferably contains change speed or reversing gearing which is adapted to be manipulated by means of gear shift lever 60.

Shaft 59 is connected to and drives a tubular shaft 61 through a universal joint 62. This tubular shaft is slidably mounted on a splined shaft 63 connected to a short shaft 64 by means of a second universal joint 65. At its forward end shaft 64 carries a worm 66 meshing with and driving a worm gear 67 on the lower cutter carrying shaft 50 whereby the lower cutters are driven. For driving the upper cutters 48 and 49 a beveled pinion 68 on shaft 64 meshes with and drives a similar pinion 69 on a vertical shaft 70. At its upper end shaft 70 carries a beveled gear 71 meshing with and driving a gear 72 on shaft 73 which also carries a worm 74 meshing with and driving a worm wheel 75 on the upper cutter shaft 50. To prevent interruption of the drive when the slides are given relative movement the gears 69 and 71 are keyed to shaft 70 by the key and elongated slot arrangement as shown in Fig. 4.

The position of the work on the turret is shown in Figs. 1 and 2. Here the connecting rods are shown disposed with their crank receiving ends adjacent and spaced by a mounting and spacing block 76. Operation of the cutters is probably best shown in Fig. 6. From this figure it will be readily apparent that the large diameter or outside cutters 48 mill off the surfaces 77 and 78 at the upper and lower sides of the connecting rod, while the cutters 49 mill off the upper and lower surfaces 79 and 80 at the same time or during the same operation. It will also be clear that two connecting rods are completed at each operation.

The machine can obviously be fitted with different types of cutters for cutting other portions of the connecting rods as for instance the ends indicated by 87.

Means are provided for moving the cutter slides toward each other. To this end cams 81 and 82 are provided on the cam shaft 24 which is driven by gear 83 meshing with worm 84 driven by sprocket 85 which in turn is driven by a chain 86 running from within the housing 58 where it is driven by a sprocket.

Cam 81 is engaged by a roller 88 carried by a rocker arm 89 pivotally mounted as at 90 to a bracket 91 carried by the upper side of guide 25. At its forward end arm 89 carries a roller 92 riding on a rail or track 93 on the upper frame member 42. Obviously the elevating of the rear end of arm 89 results in the depressing of the upper slide and cutters carried thereby against the action of springs 52.

Cam 82 acting on roller 94 depresses plunger 95 resulting in the depressing of the rear end of a rocker arm 96 due to contact of the rod or plunger 95 with a roller 97 carried by the rocker arm 96. This rocker arm 96 is pivotally mounted as at 98 on a bracket 99 carried by the under side of bed 12. At its forward end arm 96 carries a roller 100 engaging a plunger 101 which has a roller 102 engaging a rail 103 on the lower frame member 44. Depression of the rear end of rocker arm 96 will of course result in plunger 101 elevating the lower cutter slide and the cutters carried thereby.

It will now be clear that the work being secured to the turret and the turret having moved to bring the work into operative position, the carriage 27 will be advanced by cam 31. At the same time cams 81 and 82 will operate to move the cutters toward each other and feed the cutters into the work. Upon the high point of the cams 81 and 82 being passed the sets of springs 52 and 53 operate to move the cutters away from each other and back to their normal positions ready for the next operation.

Having thus described my invention what I claim is:

1. In a milling machine, a bed, a turret mounted forwardly on said bed, a guide on said bed rearwardly of said turret, a cutter carriage in said guide and mounted for horizontally reciprocating movement, means to impart said movement to the carriage, guides mounted on the forward end of said carriage, upper and lower cutters on said guides, means to rotate said cutters, said cutters mounted for movement toward and from each other, spring means normally tending to move said cutters from each other, and other means for moving said cutters toward each other and against the action of said spring means.

2. In a milling machine, a bed, a turret mounted forwardly on said bed, a guide on said bed rearwardly of the turret, a cutter carriage on said guide, and mounted for horizontal reciprocating movement, a cam shaft rearwardly of said guide, a cam on said shaft for reciprocating said carriage guides on the forward end of the carriage, upper and lower cutters on said guides, said cutters mounted for movement toward and away from each other, spring means normally tending to move said cutters from each other, a rocker arm pivotally mounted by a bracket on the upper side of the guide, a cam on said cam shaft for rocking said rocker arm to cause the same to depress the upper cutter against the action of its spring, a second rocker arm pivotally mounted on a bracket on the lower side of the guide, and a cam on said cam shaft for moving said second rocker arm to cause it to elevate the lower cutter against the action of its spring.

3. In a milling machine, a bed, a turret mounted forwardly on said bed, a guide on the bed rearwardly of the turret, a cutter carriage in said guide for horizontal movement toward and away from the turret, means for reciprocating the carriage, upper and lower cutters on the forward portion of said carriage, and means to move said cutters toward and away from each other, as the cutters move toward and from the turret.

4. In a milling machine, a bed, a turret forwardly on said bed, a guide rearwardly on the bed, a cutter carriage in said guide and reciprocable toward and from said turret, means to reciprocate the carriage in the guide, a pair of cutter slides mounted on the carriage, cutters carried by each slide and movable toward and from each other, means to move said cutters toward each other when said carriage moves forwardly, and other means to move said cutters from each other as said carriage moves rearwardly.

5. A machine as in claim 4 including a continuously meshing gear means for continuously rotating the cutters.

6. In a milling machine, a bed, a guide, a reciprocable carriage in said guide, means to reciprocate the carriage, slides arranged one above the other on the carriage, cutters mounted in the slides for movement toward and from each other, springs tending normally to move said upper cutter upwardly from said lower cutter, spring means normally tending to move the lower cutter downwardly from said upper cutter, and a pair of pivoted arms having a scissor-like action each adapted to move one of said cutters, means pivoting one of the arms on the guide, means for operating said arms for moving the cutters toward each other and against the action of the springs, and rollers and track means providing connections between the arms and the cutters.

7. In a milling machine, a bed, a turret, means for indexing and locking the turret, a guide on the bed to one side of the turret, a cutter carriage in said guide, means to reciprocate the carriage in said guide toward and from the turret, upper and lower slides and cutters carried by the carriage adjacent the turret, said slides and cutters mounted for sliding movement toward and from each other, means to move the slides and cutters toward each other when the turret is locked, and means to move the cutters from each other while the turret is unlocked.

8. In a milling machine, a work holder, a carriage at one side of the work holder, a pair of cutter slides on the end of the carriage closest the work holder and mounted for sliding movement toward and from each other, a cutter on each of said slides, power means to move said slides and cutters toward each other, other means to slide the cutters apart, means mounting the carriage for movement toward and from the work holder, and means to move the carriage toward and from the work holder.

9. In a milling machine, a bed, a turret mounted forwardly thereon, a cutter carriage mounted on the bed, a cam shaft, cams on the cam shaft, means for reciprocating the carriage, a rocker arm mounted above the carriage and operated by a cam on the cam shaft, a second rocker arm pivotally mounted below the bed and carriage and operated by a cam on the cam shaft, cutter slides mounted one above the other in the forward end of the carriage, one being engaged and operated by one rocker arm and the other by the other rocker arm, and cutter shafts and cutters carried by the slides.

10. In a milling machine, an indexable workholder, a reciprocatory carriage adapted to move toward and from the work holder, two cutters slides mounted on the one carriage, one at each side of the work holder and arranged one above the other and adapted to move together, a cutter on each of said slides, means for moving the slides and cutters toward and away from each other and the work holder situated therebetween to perform simultaneous operations on opposite sides of a work piece, and power driven means to feed the slides backward and forward and the cutters toward and from each other to operate on opposite sides of a piece of work in the holder.

Signed at Bridgeport, in the county of Fairfield and State of Connecticut, this 24th day of January, A. D. 1929.

NEWMAN M. MARSILIUS.